United States Patent [19]

Kubota et al.

[11] Patent Number: 5,147,656

[45] Date of Patent: * Sep. 15, 1992

[54] APPARATUS FOR VULCANIZING ELASTOMER PRODUCT

[75] Inventors: Akinori Kubota, Kobe; Masaaki Ijiri, Aichi; Michihito Kobayashi, Toyota, all of Japan

[73] Assignee: Sumitomo Rubber Industries Limited, Kobe, Japan

[*] Notice: The portion of the term of this patent subsequent to Jun. 4, 2008 has been disclaimed.

[21] Appl. No.: 665,510

[22] Filed: Mar. 6, 1991

Related U.S. Application Data

[63] Continuation-in-part of Ser. No. 287,413, Dec. 20, 1988, Pat. No. 5,020,982, and a continuation-in-part of Ser. No. 614,429, Nov. 15, 1990.

[30] Foreign Application Priority Data

Dec. 29, 1987 [JP] Japan .................. 62-334256
Jul. 19, 1988 [JP] Japan .................. 63-180798

[51] Int. Cl.[5] .................. B29C 35/04; B29D 30/00
[52] U.S. Cl. .................. 425/42; 264/501; 264/326; 425/28.1; 425/50
[58] Field of Search .......... 264/315, 326, 85, 501; 425/22, 23, 24–26, 27, 36, 39, 40, 42, 44, 48, 50, 28.1, 29

[56] References Cited

U.S. PATENT DOCUMENTS

| | | | |
|---|---|---|---|
| 2,846,722 | 8/1958 | Soderquist | 425/42 |
| 2,858,566 | 11/1958 | Brundage | 425/42 |
| 3,118,181 | 1/1964 | Cork | 425/23 |
| 3,329,748 | 7/1967 | Hugger | 264/315 |
| 3,887,313 | 6/1975 | Jaedicke et al. | 425/42 |
| 4,027,543 | 6/1977 | Johnston | 264/85 |
| 4,184,823 | 1/1980 | Williams | 425/36 |
| 4,370,283 | 1/1983 | Arimatsu | 264/37 |
| 4,382,052 | 5/1983 | Arimatsu | 264/85 |
| 4,527,946 | 7/1985 | Sihgh et al. | 425/36 |
| 4,684,338 | 8/1987 | Steidl et al. | 264/315 |

FOREIGN PATENT DOCUMENTS 57-185134 11/1982 Japan .

Primary Examiner—Jan H. Silbaugh
Assistant Examiner—Mathieu Vargot
Attorney, Agent, or Firm—Jordan and Hamburg

[57] ABSTRACT

An apparatus for vulcanizing elastomer product including separate passages to supply the heating and pressurizing medium through respective blow supply nozzles with the heating medium being blown to a lower portion of the vulcanizing chamber and the pressurizing medium being blown to an upper portion of the vulcanizing chamber.

12 Claims, 12 Drawing Sheets

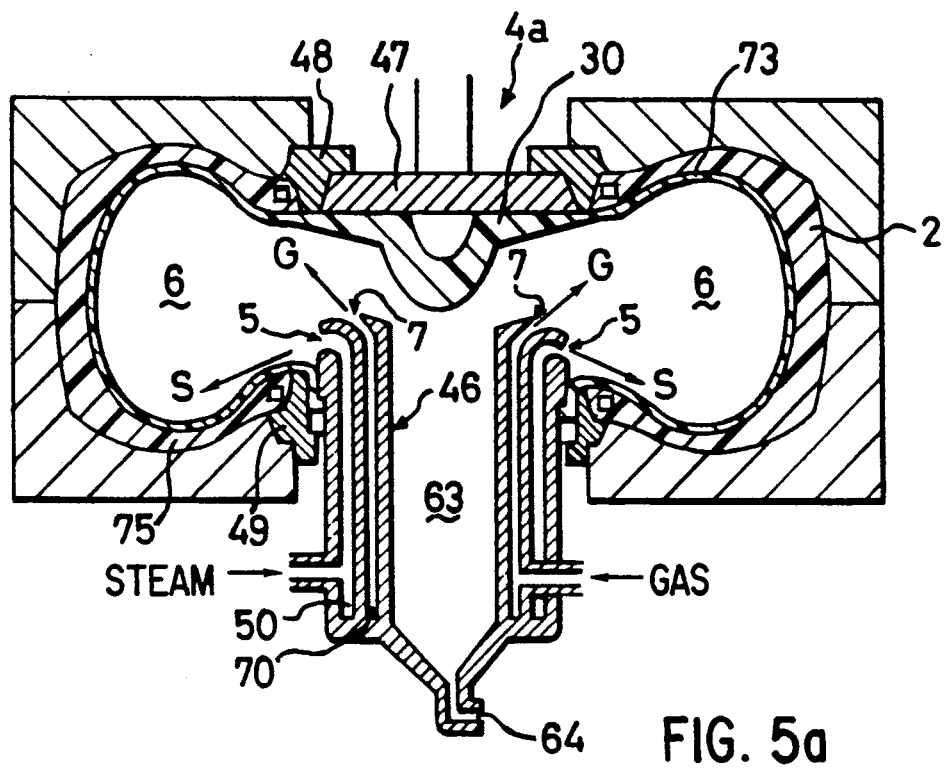
FIG. 5a
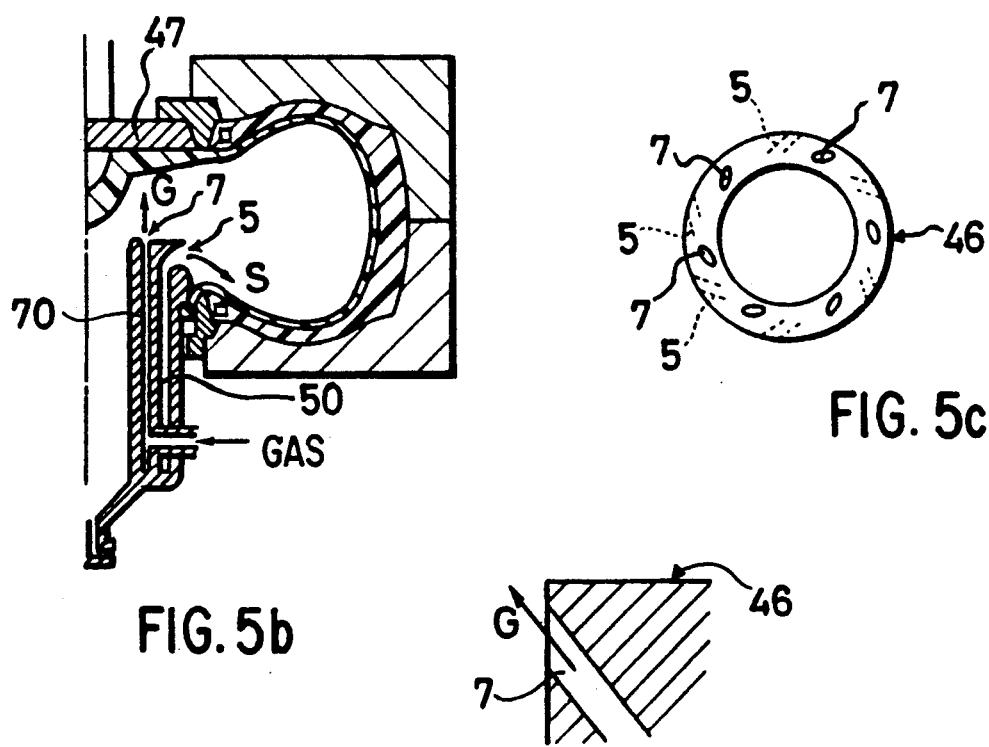
FIG. 5b
FIG. 5c
FIG. 5d

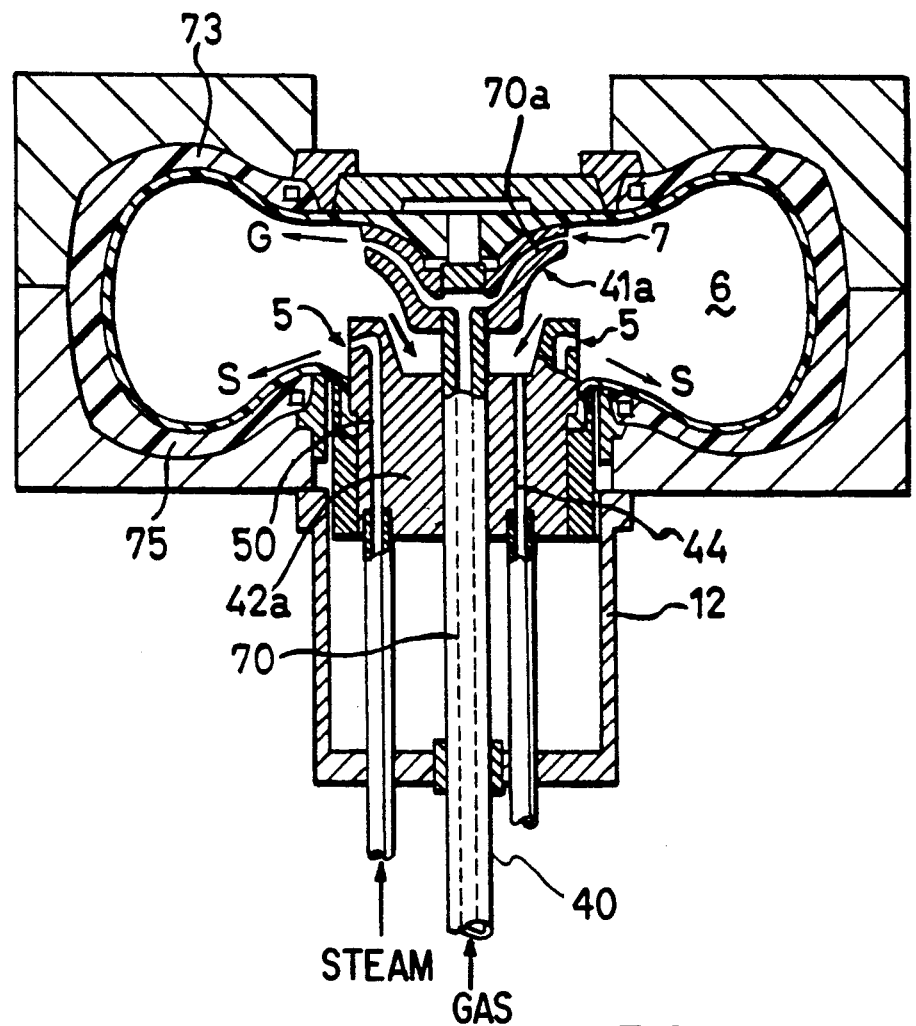
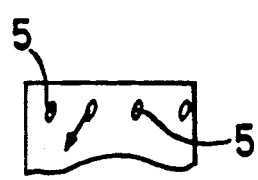
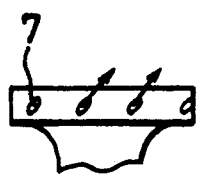
FIG. 6a
FIG. 6b
FIG. 6c

APPARATUS FOR VULCANIZING ELASTOMER PRODUCT

This is a continuation-in-part application of U.S. patent application Ser. No. 287,413, filed Dec. 20, 1988, now U.S. Pat. No. 5,020,982, and of U.S. patent application Ser. No. 614,429, filed Nov. 15, 1990.

BACKGROUND OF THE INVENTION AND RELATED ART STATEMENT

This invention relates to a method and appatatus for vulcanizing an elastomer product such as a tire for a motor vehicle using gas and steam as a pressurizing medium and a heating medium.

FIG. 9 shows a conventional method for vulcanizing an elastomer product such as a tire for a motor vehicle using gas as a pressurizing medium which comprises the steps of placing a tire 2 in a mold 1, bringing a bladder 3 in contact with the inner surface of the tire 2 with application of pre-shaping pressure, closing the mold 1 to bring the tire 2 in contact with the mold inner surface, heating the tire 2 under pressure by supplying steam as a heating medium, the steam being blown in a substantially horizontal direction from nozzles 59 provided in a central unit of the vulcanizing machine and communicated with a supply passage 70 into an inner space 6 of the tire 2 or vulcanizing chamber, stopping the supply of steam either when the temperature of the tire rises to a specified temperature or after the lapse of a predetermined period of time, and supplying combustion gas or nitrogen gas as a pressurizing medium at a pressure equal to or higher than that of the steam, the gas being blown in a horizontal directions from the nozzles 59 or pressurizing medium nozzles provided at the same level as the steam nozzles 59 and communicated with the supply passage into the inner space 6 of the tire 2.

In the conventional method in which steam is blown in a substantially horizontal direction, an amount of steam condenses in a lower portion of the inner space 6 without being discharged and tends to prevent the lower side wall of the tire 2 from rising in temperature. Pressurizing gas has a temperature lower than that of steam. A portion to which pressurizing gas is blown, e.g., the lower bead portion, is liable to be undesirably cooled. Additionally, pressurizing gas has a specific gravity greater than that of steam when being introduced and is accordingly liable to stay in a lower portion of the inner space 6. Consequently, the temperature of the lower side wall and lower bead portion of the tire which are in contact with low temperature gas becomes low. On the other hand, steam is liable to stay in an upper portion of the inner space 6 and comes to a high temperature because of being adiabatically compressed by pressurizing gas supplied at high pressure. This results in an undesirable rise in the temperature of the upper side wall of the tire 2. In the inner space 6, consequently, there are a layer 61 of steam in the upper portion, a layer 62 of gas in the lower portion, and a layer 63 of steam condensate in the lowermost portion. Accordingly, as shown FIG. 4a, for example, the temperature at point A on the upper bead portion of the tire 2 rises as shown by solid line 16 after gas is supplied, the temperature at point B on the lower bead portion of the tire 2 lowers as shown by solid line 15 after gas is introduced. Consequently, a great temperature difference, e.g., 13° C., occurs between points A and B.

Also, as shown in FIG. 4b, the temperature at point C on the upper side wall of the tire 2 rises as shown by solid line 16a after gas is supplied, the temperature at point D on the lower side wall of the tire 2 does not rise as shown by a solid line 15a after gas is supplied. Consequently, a great temperature difference, e.g., 12° C., occurs between points C and D.

After such a great temperature difference occurs, the temperature difference does not entirely disappear until the vulcanizing operation is completed. Accordingly, it could be seen that the vulcanization degrees of the upper and lower side walls of the tire 2 become different from each other. Such difference is undesirable to the quality of product. Moreover, since the necessary vulcanizing time of a tire is determined based on vulcanization of a lower portion of the tire where the temperature rises most slowly, an undesirable long time is required. It would be apparent that such a long time is disadvantageous as regards productivity and energy saving.

SUMMARY OF THE INVENTION

The present inventoin has overcome the above-mentioned problems.

It is an object of the present invention to provide a method and apparatus for vulcanizing elastomer product which makes it possible to eliminate temperature difference from occurring in the elastomer product during gas vulcanizing to assure uniform vulcanizing and reduce energy loss.

Accordingly, a method of the present invention comprises the steps of heating under pressure an elastomer prodjct placed in a mold by supplying a heating medium such as steam, stopping the supply of the heating medium when the elastomer product rises to a predetermined temperature or after the lapse of a specified period of time, supplying a pressurizing medium such as nitrogen gas at a pressure equal to or higher than that of the heating medium until the heating process is completed, and discharging the vulcanizing medium after the heating process, the heating medium being blown to a lower portion of the vulcanizing chamber, the pressurizing medium being blown to an upper portion of the vulcanizing chamber.

Also, according to the present invention, in an apparatus for vulcanizing elastomer an product in which an elastomer product placed in a mold is heated under pressure by supplying a heating medium such as steam, the supply of the heating medium is stopped when the elastomer product rises to a predetermined temperature or after the lapse of a specified period of time, a pressurizing medium such as nitrogen gas is then supplied at a pressure equal to or higher than that of the heating medium until the heating process is completed, and the vulcanizing medium is finally discharged after the heating process, the improvement comprises a first supply means for blowing the heating medium to a lower portion of the vulcanizing chamber and a second supply means for blowing the pressurizing medium to an upper portion of the vulcanizing chamber.

Accordingly, the heating medium or steam having a high temperature is blown in a downward direction in an inner space of the elastomer product. The pressurizing medium or gas having a low tempertture is blown in an upward direction. When using steam as a heating medium, steam is liable to undergo condensation in the bottom portion of the inner space and such condensation is dispersed by virtue of its downward flow. Consequently, condensate which hinders heating of the lower portion of the tire is greatly reduced. Furthermore, since steam having a high enthalpy is blown to a lower portion, the lower portion is more effectively heated.

Moreover, gas as a pressurizing medium cools the upper portion of the inner space and mixes with steam due to the upward moving energy at the initial blowing. Consequently, the steam is prevented from being adiabatically compressed in an upward direction. Further, even at a stage where the inner pressure increases to decrease the blowing velocity of gas and steam undergoes condensation to allow gas to blow in, gas mixes with the steam in the lower portion because it moves down due to its low temperature and high specific gravity. Consequently, heat exchange occurs between the gas and the steam, so that the gas rises in temperature. As a result, the gas does not stay in the lower portion and widely disperses, which consequently prevents temperature difference from occurring in the inner space of the tire or vulcanizing chamber.

BRIEF DESCRIPTION OF THE DRAWINGS

FIG. 3b is a side view of a steam blowing section of the embodiment of FIG. 3a;

FIG. 3c is a side view of a gas blowing section of the embodiment of FIG. 3a;

FIGS. 4a and 4b are graphs showing the relationship between vulcanizing time and temperature of specified points on an elastomer product in the embodiment of FIG. 3a;

FIG. 5a is a vertical sectional view showing a sixth embodiment of the present invention;

FIG. 5b is a vertical sectional view showing another gas blowing section of the embodiment of FIG. 5a;

FIG. 5c is a plan view of the gas blowing section of FIGS. 5a and 5b;

FIG. 5d is a partial vertical sectional view showing still another gas blowing section;

FIG. 6a is a vertical sectional view showing a seventh embodiment of the present invention;

FIG. 6b is a side view of a steam blowing section of the embodiment of FIG. 6a;

FIG. 6c is a side view of gas blowing section of the embodiment of FIG. 6a;

FIG. 7b is a plan view of a gas blowing section of the embodiment of FIG. 7a;

FIG. 8b is a plan view of a gas blowing section of the embodiment of FIG. 8a.

DETAILED DESCRIPTION OF PREFERRED EMBODIMENTS OF THE INVENTION

Figure 1A:
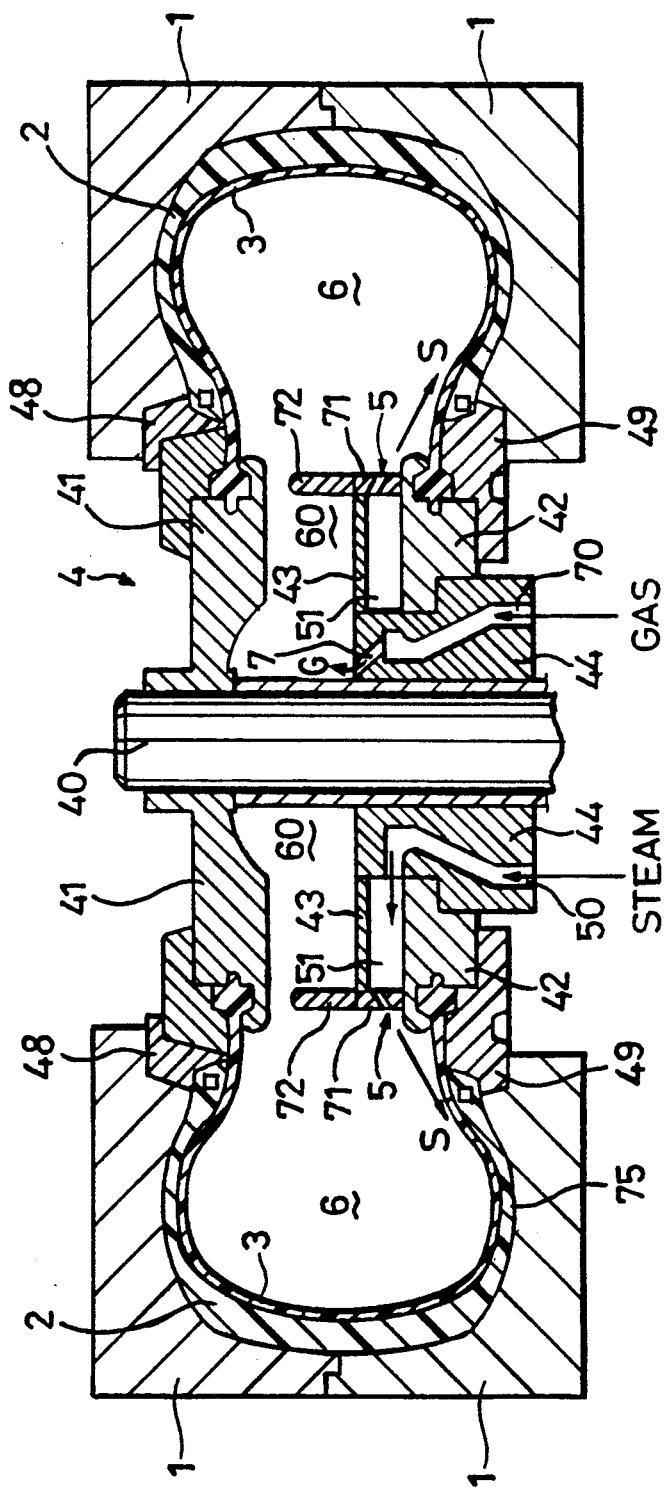
FIG. 1a is a vertical sectional view showing a first embodiment of the present invention.
Figure 1B:
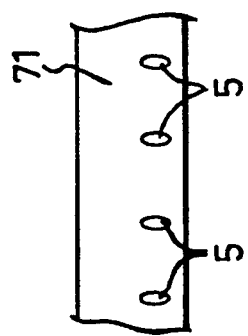
FIG. 1b is a partial side view of a weir wall member of the first embodiment.
Figure 9:
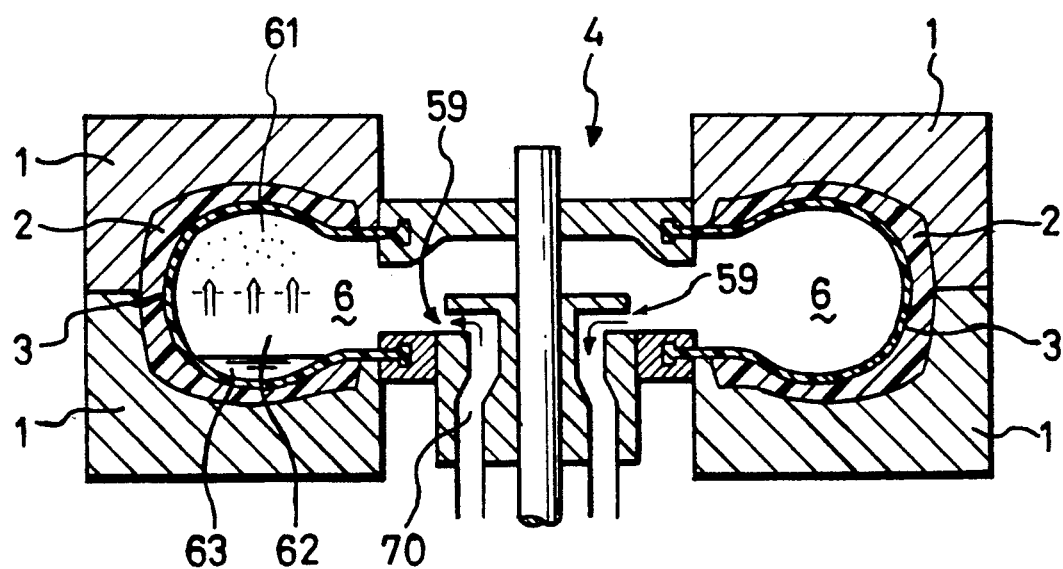
FIG. 9 is a vertical sectional view of a conventional apparatus.

Referring to FIGS. 1a and 1b showing a first embodiment of the present invention, a mold 1 and a central unit 4 of a vulcanizing machine are almost the same as the conventional apparatus of FIG. 9. However, means for blowing steam and gas provided in the central unit 4 is different. More specifically, a center post 40 and an upper clamp member 41 are constructed in the same manner as the conventional apparatus. However, a first blow means is constructed as follows. A steam supply passage 50 is formed in a piston gland 44. Also, an annular supply junction chamber 51 is formed around the center post 40 and defined by a ring-like upper plate 43 mounted on an upper portion of the piston gland 44 and a circumferential weir wall member 71 mounted on the peripheral end portion of a top surface of a lower clamp member 42. The supply junction chamber 51 is communicated with the steam supply passage 50. The circumferential weir wall member 71 of the supply junction chamber 51 has a plurality of steam nozzles 5 at a predetermined interval in a peripheral direction of the circumferential weir wall member 71. The nozzle 5 is directed in a downward direction so as to face a lower portion of the inner space of a tire 2, more specifically, to face a lower side wall 75 of the tire 2. In the drawing, numeral 49 denotes a lower bead ring and numeral 48 an upper bead ring. A second blow means is constructed as follows. A gas supply passage 70 is formed in the piston gland 44. The gas supply passage 70 also serves as a steam condensate discharging passage. For example, two nozzles 7 are formed in an upper portion of the piston gland 44, namely at a lower position in the neighborhood of a central mechanism of the vulcanizing machine. The nozzle 7 is communicated with the gas supply passage 70 and is directed in an upward direction so as to face an upper portion of an inner space, for example, to the upper central portion of the vulcanizing machine. A cylindrical partition or enclosing wall 72 is mounted on the circumferential weir wall member 71 of the junction chamber 51 so as to define a space 60 for gas.

The distance between the upper end of the enclosing wall 72 and the bottom surface of the upper clamp member 41 is set within about 10% to 30% of the distance between the bottom surface of the upper clamp member 41 and the top surface of the lower clamp member 42 when the mold is entirely closed. In the case of 30% or more, the gas enclosing (sheeting) effect is reduced. In the case of 10% or less, on the other hand, the effect of draining steam condensate is decreased.

Figure 1C:
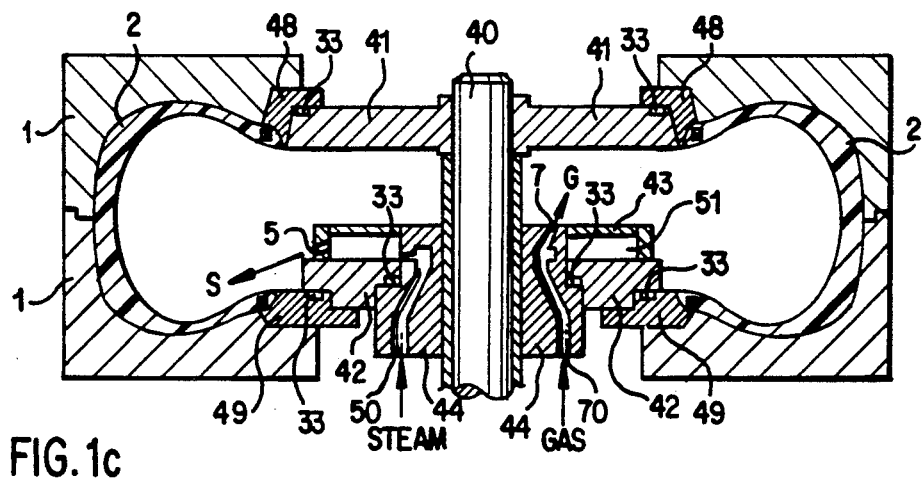
FIGS. 1c, 1d and 1e are vertical sectional views similar to FIG. 1a but showing three different alternate embodiments.

FIG. 1c shows an alternate embodiment similar to FIG. 1a except that in FIG. 1c there is no weir wall such as the weir wall 72 in FIG. 1a and in FIG. 1c the gas nozzle 7 discharges upwardly and radially outwardly.

Figure 1D:
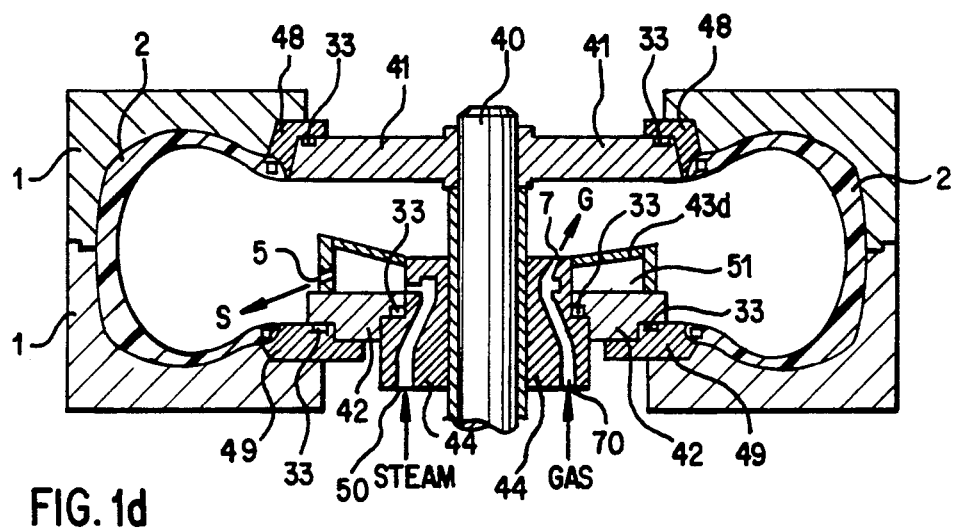

FIG. 1d shows another alternate embodiment similar to FIG. 1a except that in FIG. 1d, there is no weir wall such as the weir wall 72 in FIG. 1a and further in FIG. 1d, the upper plate 43d slopes downwardly as the center post is approached. Also in FIG. 1d, the gas nozzle 7 discharges upwardly and radially outwardly.

Figure 1E:
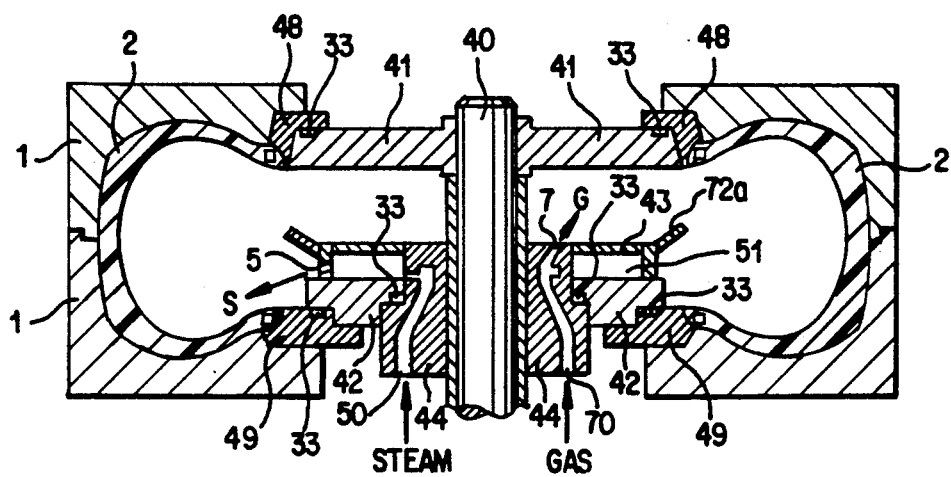

FIG. 1e shows a further alternate embodiment similar to FIG. 1a except that in FIG. 1e, there is no weir wall such as the weir wall 72 in FIG. 1a but rather there is provided in FIG. 1e a slanting member 72a disposed at the outer periphery of the upper plate 43. Also, in FIG. 1e, the gas nozzle 7 discharges upwardly and radially outwardly.

Figure 2A:
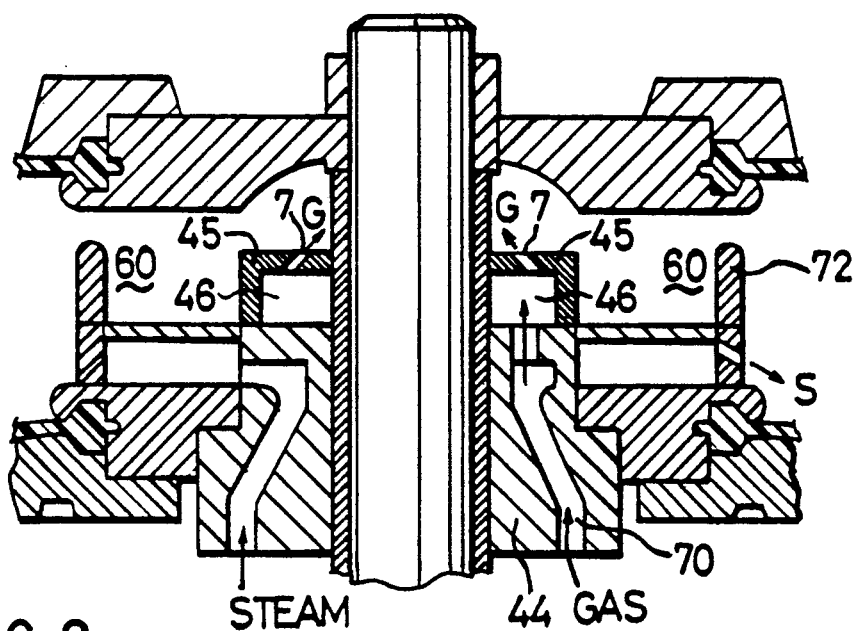
FIG. 2a is a vertical sectional view showing a second embodiment of the present invention.

FIG. 2a shows a second embodiment of the present invention which is the same as the embodiment of FIG. 1a with exception of the followings. An annular gas supply junction chamber 46 is provided over a top surface of a piston gland 44 and around a center post 40. The gas supply chamber 46 is defined by a casing 45. The gas supply junction chamber 46 is communicated with a gas supply passage 70. The casing 45 has a plurality of gas nozzles 7 in a peripheral direction in the top wall thereof. The nozzle 7 is directed so as to face an upper portion of a vulcanizing chamber, for example, so as to face an upper central portion of the chamber. It should be noted that in this embodiment, a partition or enclosing wall 72 is not always needed.

Figure 2B:
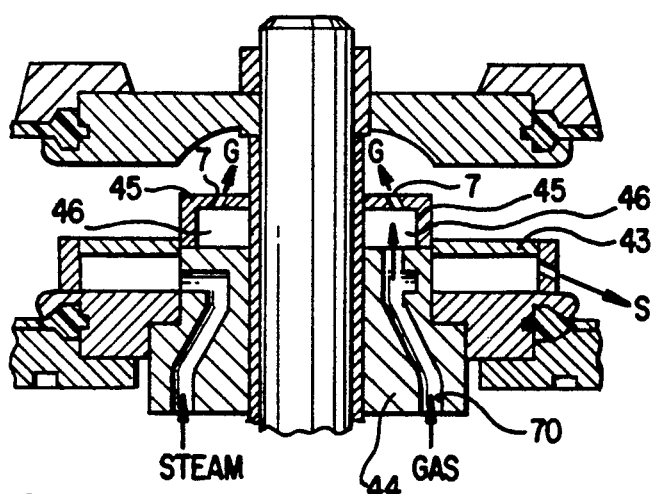
FIGS. 2b, 2c and 2d are vertical sectional views similar to FIG. 2a but showing three different alternate embodiments.
Figure 2C:
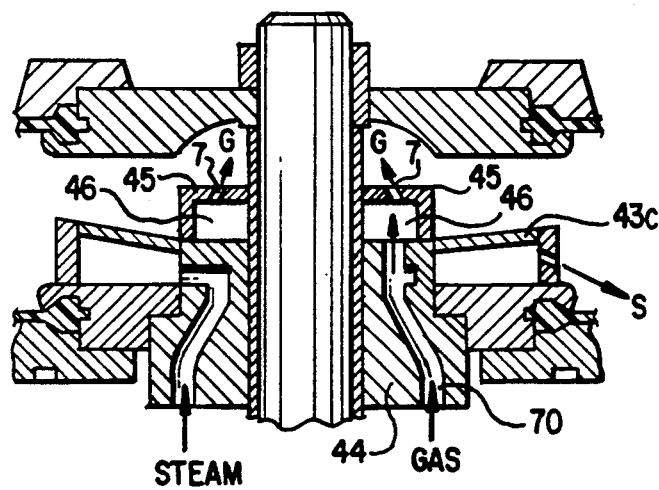
Figure 2D:
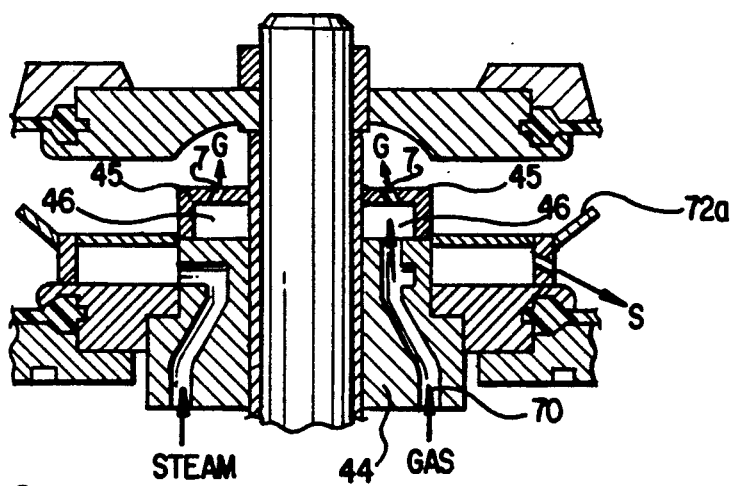

FIG. 2b shows an alternate embodiment similar to FIG. 2a, except that in FIG. 2b, there is no weir wall such as the weir wall 72 in FIG. 2a;

FIG. 2c shows another alternate embodiment similar to FIG. 2a, except that in FIG. 2c, there is no weir wall such as the weir wall 72 in FIG. 2a and further in FIG. 2c, the upper plate 43c slopes downwardly as the center post 40 is approached;

FIG. 2d shows a further alternate embodiment similar to FIG. 2a, except that in FIG. 2d, there is no weir wall such as the weir wall 72 in FIG. 2a but rather there is provided in FIG. 2d a slanting weir wall member 72a disposed at the outer periphery of the upper plate 43.

Figure 3A:
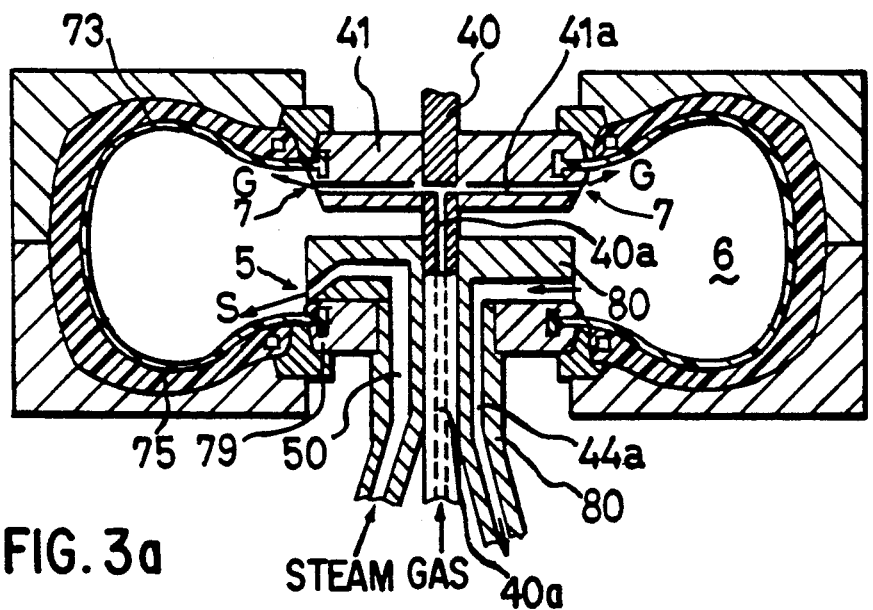
FIG. 3a is a vertical sectional view showing a third embodiment of the present invention.
Figure 3B:
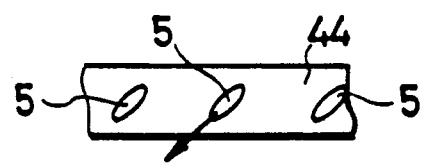
Figure 3C:
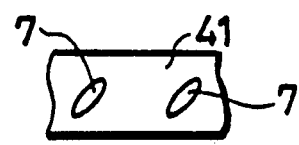

FIGS. 3a, 3b, and 3c illustrate a third embodiment in which the present invention is applied for a Bag-O-Matic type vulcanizing machine. A second blow means is constructed as follows. A gas supply passage 40a is formed in a center post 40 and communicated with a plurality of blow passages 41a which are radially formed in an upper clamp member 41. Nozzles 7 are formed at a forward end of each of the blow passages 41a so as to face an upper portion of an inner space 6, for example, so as to face an upper side wall 73 of a tire. Furthermore, it may be appropriate that the nozzle 7 is directed in an upward peripheral direction so that upwardly blown gas can circulate in a peripheral direction in the inner space 6 of the tire.

Furthermore, a first blow means is constructed as follows. A steam supply passage 50 is formed in the lower clamp ring hub 79 and communicated with a plurality of nozzles 5 which face a lower portion of the inner space 6, for example, face a lower side wall 75 of the tire. It may be appropriate that the nozzle 5 is directed in a downward peripheral direction so that downwardly blown steam can circulate in a peripheral direction in the inner space 6. The lower clamp ring hub 79 has a passage 44a for discharging steam and gas. An upper portion of the passage 44a extends in a radial direction to communicate with the inner space 6. It would be noted that it is sufficient to provide one opening to communicate the passage 44a with the inner space 6.

Figure 3D:
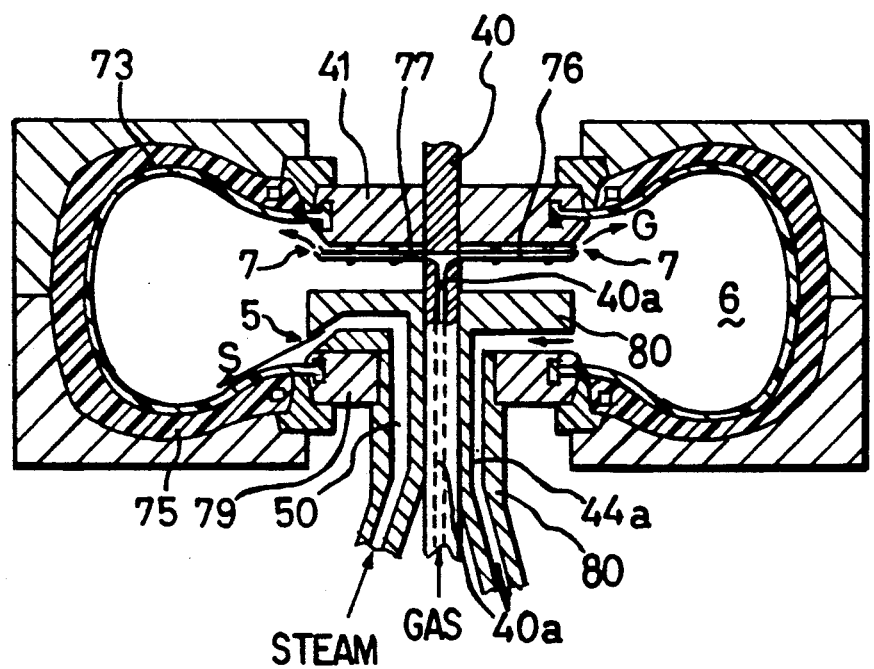
FIG. 3d is a vertical sectional view showing a fourth embodiment of the present invention.

FIG. 3d shows a fourth embodiment in which a plurality of tubular supply members 76 are radially fixed to the underside of an upper clamp member 41 by retainers 77. One end of each member 76 is communicated with a supply passage 40a formed in an center post, the other end being communicated with the upper portion of inner space 6, thus forming a second blow means.

Figure 3E:
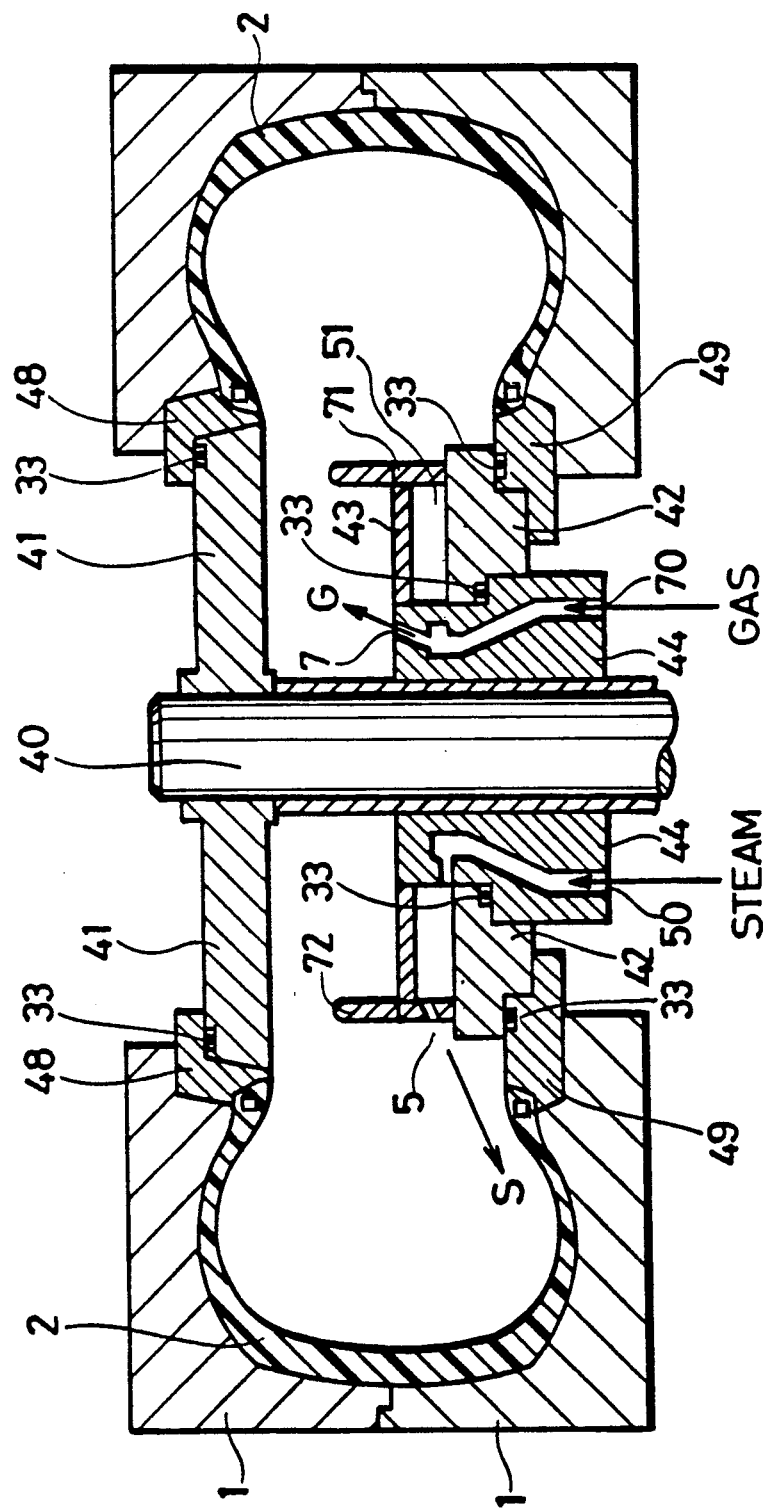
FIG. 3e is a vertical sectional view showing a fifth embodiment of the present invention.

FIG. 3e shows a fifth embodiment in which a bladder is not used.

It is noted that the present invention can be applied for bladderless vulcanizing machines carrying no bladder, for example, one as shown in FIG. 3e, as well as ones carrying a bladder. In such a bladderless vulcanizing machine as shown in FIG. 3e, sealing rings 33 are provided in appropriate positions, specifically, an interface between an upper bead ring 48 and an upper clamp member 41, an interface between a lower bead ring 49 and a lower clamp member 42, and an interface between a piston gland 44 and the lower clamp member 42 to assure sealing of these interfaces. The piston gland 44, which is provided in a center lower portion of the vulcanizing machine, is formed with a gas supply passage 70. A nozzle 7 is formed in an upper portion of the piston gland 44 and directed in an upward direction. Also, the piston gland 44 is formed with a steam supply passage 50. The steam supply passage 50 is communicated with an annular supply junction chamber 51 which is formed around a center post 40 and defined by a ring-like upper plate 43 mounted on an upper portion of the piston gland 44 and a circumferential weir wall member 71 mounted on a peripheral end portion of a top surface of the lower clamp member 42. The weir wall member 71 of the supply junction chamber 51 has a plurality of steam nozzles 5 at a predetermined interval in a peripheral direction of the weir wall member 71. The nozzle 5 is directed in a downward direction so as to face the lower portion of the inner space of a tire 2, more specifically, to face the lower side wall 75 of the tire 2.

FIGS. 5a, 5b, and 5c illustrate a sixth embodiment in which the present invention is applied for an auto-form type vulcanizing machine. As shown in FIG. 5a, a central mechanism 4a comprises a chuck assembly 47, a bead ring 48 mounted around the assembly 47, a bag well 46, and a bead ring 49 mounted around the bag well 46. A bladder 30 extends across an upper center portion where it is received by the chuck assembly 47 and the bead ring 48. The inner peripheral end of the bladder 30, which is positioned in a lower portion, is held by the bag well 46 and the bead ring 49.

The bag well 46 has a space 63 in its center portion and an outlet 64 for discharging steam and gas from the inner space 6 in its lower end. The bag well 46 is also provided with a steam supply passage 50 and a gas supply passage 70. The steam supply passage 50 is communicated with a plurality of steam nozzles 5 which are circumferentially arranged at a predetermined interval in an upper portion of the steam supply passage 50 and are formed so as to face the lower portion of the inner space 6, for example, to face the lower side wall 75 of a tire 2, thus providing a first blow means. The gas supply passage 70 is communicated with a plurality of gas nozzles 7 which are circumferentially arranged at a predetermined interval in an upper portion of the gas supply passage 70, namely at a lower position in the neighborhood of the central mechanism of the vulcanizing machine. The nozzle 7 is formed so as to face the upper portion of the inner space 6, for example, to face the upper side wall 73 of the tire 2, then providing a second blow means.

FIG. 5b shows a modification of the fourth embodiment in which steam nozzles 5 are made to face in a peripheral downward direction while gas nozzles 7 are made to face the chuck assembly 47.

The nozzles 5 and 7 of FIGS. 5a and 5b are formed so as to be respectively inclined in the same direction with respect to radial directions so as to allow blown steam and gas to circulate in the same peripheral direction in the inner space 6.

Furthermore, it may be appropriate that a nozzle opening 7 is formed in an upper side portion of a bag well 46 as shown in FIG. 5d.

FIGS. 6a, 6b, and 6c illustrate a seventh embodiment in which the present invention is applied to a rolling-in-bladder type vulcanizing machine. The second blow means includes a gas supply passage 70 formed in a center post 40, a plurality of blow passages 70a radially arranged in an upper clamp member 41a, and nozzles 7 provided in the forward end of respective blow passages 70a, the nozzle 7 facing an upper portion of an inner space 6, for example, an upper side wall 73 of a tire 2.

The first blow supply means includes a steam supply passage 50 formed in a bag well 42a, and a plurality of nozzles 5 which are circumferentially formed at a predetermined interval in an upper portion of the bag well 42a, the nozzles 5 being communicated with the steam supply passage 50 and facing a lower portion of the inner space 6, for example, a lower side wall 75 of the tire 2. The nozzles 5 and 7 are formed so as to be inclined with respect to respective radial directions as shown in FIGS. 6b and 6c so that blown gas and steam circulate in a peripheral direction in the inner space 6. Indicated at 44 is a drain conduit. Indicated at 12 is a sleeve.

Figure 7A:
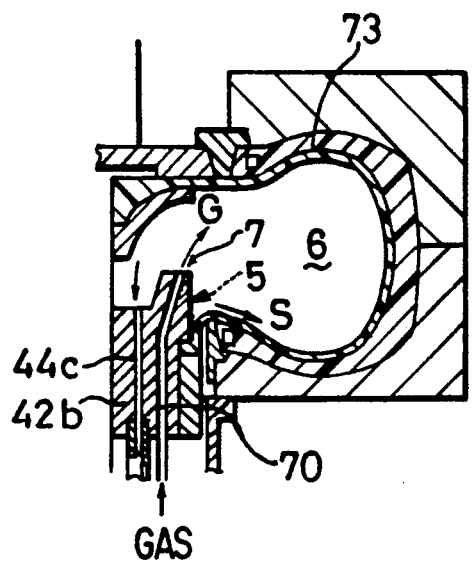
FIG. 7a is a vertical sectional view showing a eighth embodiment of the present invention.
Figure 7B:
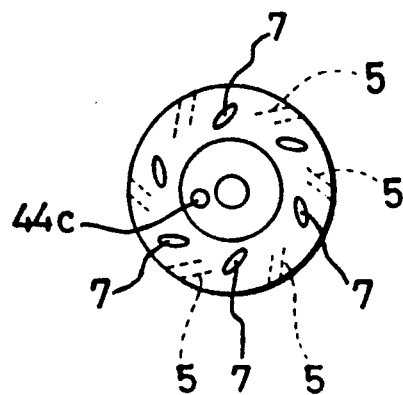

FIGS. 7a and 7b illustrate a eighth embodiment of the present invention. A gas supply passage 70 is provided in a bag well 42b and communicated with a plurality of nozzles 7 which are circumferentially arranged at a predetermined interval in an upper portion of the gas supply passage 70, namely at a lower position in the neighborhood of the central mechanism of the vulcanizing machine. The nozzle 7 is formed so as to face an upper portion of an inner space 6, for example, an upper side wall 73. Also, a steam supply passage, not shown, is provided in a bag well 42b and communicated with a plurality of nozzles 5 which are circumferentially arranged at a forward portion of the steam supply passage (not shown) and formed so as to face a lower portion of the inner space 6, for example, a lower side wall 75. The nozzles 5 and 7 are formed so as to be inclined with respect to respective radial directions as shown in FIG. 7b so that blown gas and steam circulate in a peripheral direction in the inner space 6. Furthermore, a passage 44c for discharging gas and steam is provided near the center of the bag well 42b.

Figure 8A:
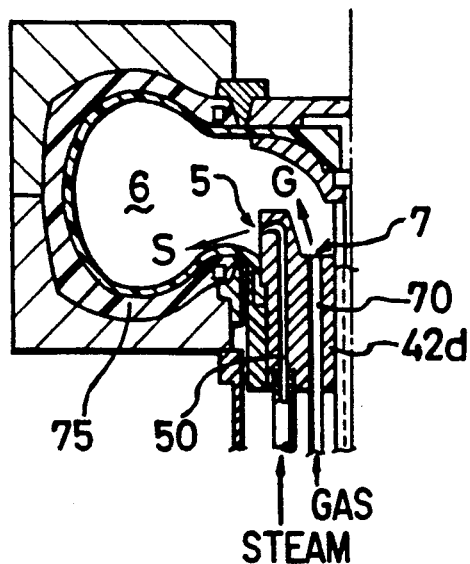
FIG. 8a is a vertical sectional view showing a ninth embodiment of the present invention.
Figure 8B:
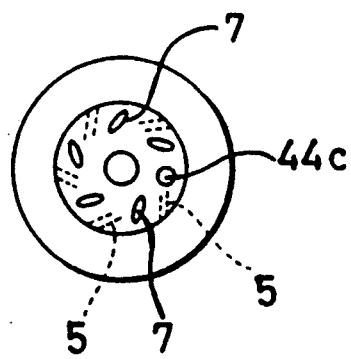

FIGS. 8a and 8b illustrate a ninth embodiment of the present invention. A gas supply passage 70 is formed in a well portion of a bag well 42d and communicated with a plurality of nozzles 7 which are circumferentially arranged at an upper portion of the gas supply passage 70, namely at a lower position in the neighborhood of the central mechanism of the vulcanizing machine. The nozzle 7 is formed so as to face an upper portion of an inner space 6. Also, a steam supply passage 50 is formed in an outer portion of the gas supply passage 70 and communicated with a plurality of nozzles 5 which are circumferentially arranged at an upper portion of the steam supply passage 50 and formed so as to face a lower portion of the inner space 6. The nozzles 5 and 7 are also inclined with respect to radial directions as shown in FIG. 8b so that blown gas and steam circulate in a peripheral direction in the inner space 6. Indicated at 44c is a drain conduit.

A method for vulcanizing an elastomer producst in the form of a tire with use of an apparatus of the present invention will now be described. As a conventional method, firstly, a tire 2 is placed in a mold 1, a bladder 3 being made to come into contact with an inner surface of the tire 2 under pressure by supplying a shaping medium through a conduit not shown in the drawings, the mold 1 being closed so that the tire 2 is made to come into contact with the inner surface of the mold.

Steam is then supplied from the steam supply passage 50 through the nozzles 5 into the inner space 6 of the tire 2 at an appropriate pressure, e.g., 15 kg/cm$^2$ for an appropriate period of time, e.g., 5 minutes. The steam is blown in a downward direction from the nozzles 5 against the lower side wall 75 to produce jet streams. The jet streams heat the tire 2 to an appropriate temperature, e.g., 180° C., at which the progress of vulcanizing reaction is assured. Pressurizing gas having a temperature as low as room temperature, e.g., 40° C., is then supplied in an upward direction from the gas supply passage 70 through the nozzles 7 into the inner space 6 at an appropriate pressure, e.g., 18 kg/cm$^2$ and for an appropriate period of time, e.g., 5 minutes. The upwardly blown gas cools the upper portion of the inner space 6, then gradually moves down to the lower portion to mix with the steam. Consequently, the upwardly blown gas, which cools the upper portion of the tire inner space 6 and mixes with the steam, prevents a great temperature difference from occurring between the upper and lower portions of the inner space 6.

In the embodiments of FIGS. 1a and 2a, blown gas temporarily stays within the space 60 defined by the enclosing wall 72 and then flows over the enclosing wall 72 into the inner space 6 to gradually mix with steam. Accordingly, as in conventional methods, the steam is prevented from being adiabatically compressed in the upper portion of the inner space 6, which results in an unfavorable increase in the temperature of the upper portion and a cooling down of the lower bead portion.

Figure 4A:
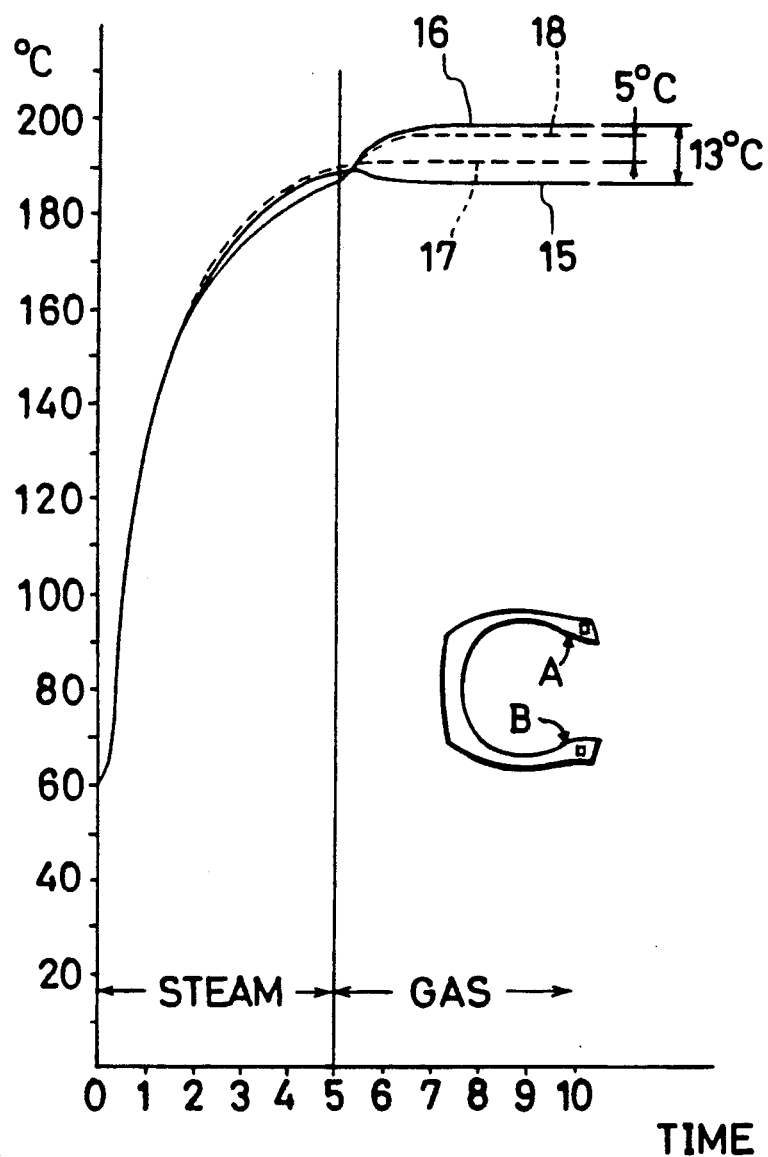

Consequently, a great temperature difference is eliminated between the upper and lower portions of the inner space 6 as conventional methods. For example, in the embodiment of FIG. 1a the temperature of point A of the upper bead portion rises along a broken line 18 of FIG. 4a after the supply of gas. The temperature of point B of the lower bead portion rises along a broken line 17 of FIG. 4a. The temperature difference between points A and B comes to be about 5° C. which is considerably small in comparison with the difference of 13° C. of the conventional method.

Figure 4B:
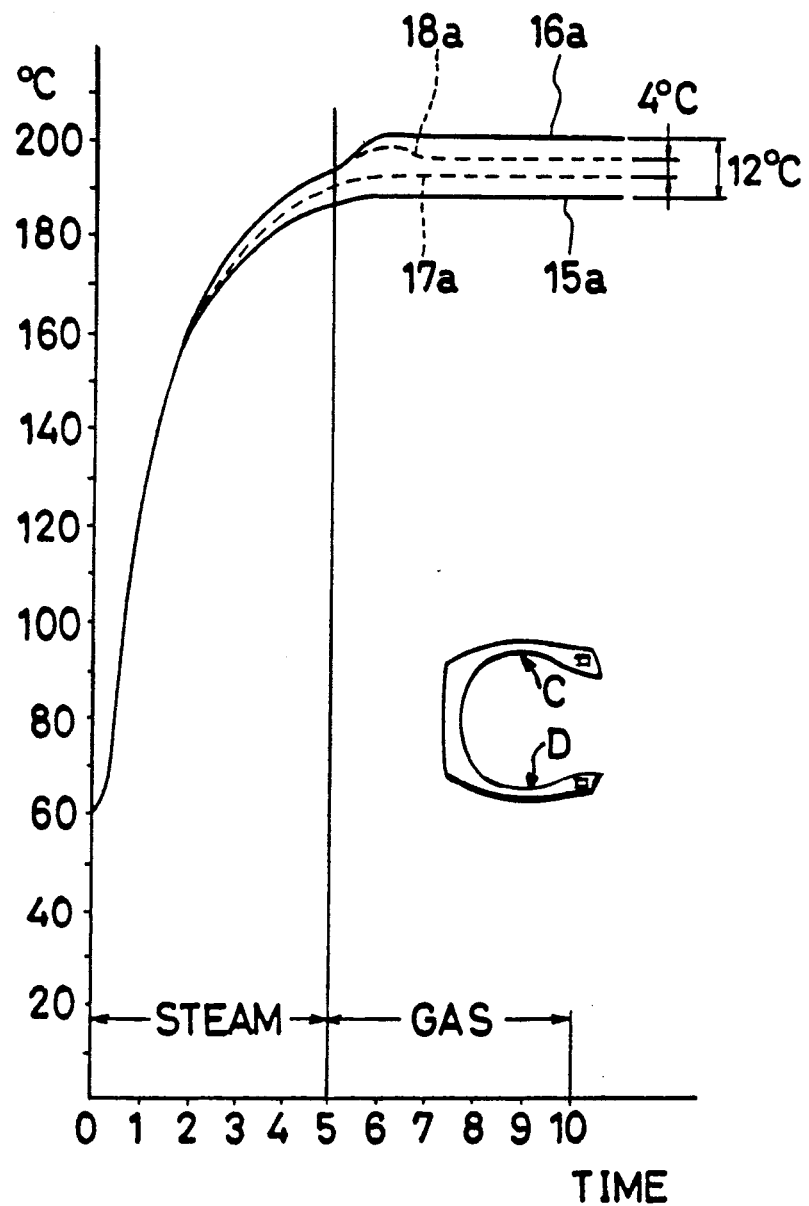

As shown in FIG. 4b, the temperature of point C of the upper side wall of a tire 2 rises along a broken line 18a after the supply of gas. The temperature of point D of the lower side wall rides along a broken line 17a. The temperature difference between points C and D comes to be about 4° C. which considerably small in comparison with the difference of 12° C. of the conventional method.

After completion of the vulcanizing operation, the mixture of gas and steam is discharged from the inner space 6 through the discharge line by opening a discharge valve not shown. Thereafter, the valve is closed and another valve for vacuum is opened to separate the bladder 3 from the tire 2. The vulcanized tire 2 is finally removed by moving an upper part of the mold 1 to open. It would be noted that in the case of vulcanizing without the use of a bladder, vacuum operation is not required.

In the case of a nylon carcass-ply tire, cooling water is introduced into the inner space. After vulcanizing, a mixture of gas and water is removed through a discharge line.

As described above, according to the present invention, heating medium, such as high temperature steam, is supplied by blowing in a downward direction into a inner space of an elastomer product placed in a mold, and pressurizing medium, such as low temperature gas, is supplied by blowing in an upward direction into the inner space. Consequently, steam and gas are properly mixed with each other to prevent a great temperature difference from occurring within the inner space and assures uniform vulcanizing. Since temperature differences are eliminated, vulcanizing can be completed in a shorter time. Thus, productivity can be improved and energy losses can be reduced.

What we claim is:

1. An apparatus for vulcanizing an elastomeric product comprising mold means in which said elastomeric product to be vulcanized is disposed, said product having a central axis which is vertically disposed such that upper and lower interior portions of said product overlie one another, a piston gland means having first supply passage means for supplying a heating medium, junction chamber means defining an annular junction chamber, said first supply passage means communicating with the interior of said junction chamber, said junction chamber means having an outer wall which separates said junction chamber from the interior of said product, first nozzle means in said outer wall directing heating medium from said junction chamber into the interior of said product in a downward direction toward said lower portion of said product, enclosure means defining an enclosure overlying said junction chamber, said piston gland means having a second supply passage means for supplying a pressurizing medium, said second supply passage means having second nozzle means disposed to discharge said pressurizing medium radially outwardly and axially upwardly at an acute angle relative to said central axis such that said pressure medium passes into said enclosure means, said enclosure means having a top wall and a bottom wall, said bottom wall having an outer peripheral end spaced from said top wall to thereby define a passage between said outer peripheral end and said top wall of said enclosure means such that pressurizing medium passes from said enclosure to the interior of said product through said passage.

2. An apparatus according to claim 1, wherein said second nozzle means is disposed radially inwardly of said junction chamber.

3. An apparatus according to claim 1, wherein said bottom wall is generally perpendicular to said central axis.

4. An apparatus according to claim 1 further comprising plate means disposed generally perpendicular to said central axis, said plate means having a common wall between said junction chamber means and said enclosure means, said plate means defining said bottom wall of said enclosure means and said top wall of said junction chamber means, said junction chamber means having an outer peripheral wall, said first nozzle means being in said outer peripheral wall.

5. An apparatus according to claim 1, wherein said piston gland means comprises a center post, said top wall being mounted on said center post.

6. An apparatus for vulcanizing an elastomeric product comprising mold means in which said elastomeric product to be vulcanized is disposed, said product having a central axis which is vertically disposed such that upper and lower interior portions of said product overlie one another, a piston gland means having first supply passage means for supplying a heating medium, junction chamber means defining an annular junction chamber, said first supply passage means communicating with the interior of said junction chamber, said junction chamber means having an outer wall which separates said junction chamber from the interior of said product, first nozzle means in said outer wall directing heating medium from said junction chamber into the interior of said product in a downward direction toward said lower portion of said product, enclosure means defining an enclosure overlying said junction chamber, said piston gland means having a second supply passage means for supplying a pressurizing medium, said second supply passage means having second nozzle means disposed to discharge said pressurizing medium radially outwardly and axially upwardly at an acute angle relative to said central axis such that said pressure medium passes into said enclosure means, said enclosure means having a top wall and a bottom wall, said bottom wall being disposed at an acute angle relative to said central axis so as to incline axially upwardly toward said top wall, said bottom wall having an outer peripheral end spaced from said top wall to thereby define a passage between said outer peripheral end of said bottom wall and said top wall of said enclosure means such that pressurizing medium passes from said enclosure to the upper portion of the interior of said product through said passage.

7. An apparatus for vulcanizing an elastomeric product comprising mold means in which said elastomeric product to be vulcanized is disposed, said product having a central axis which is vertically disposed such that upper and lower interior portions of said product overlie one another, a piston gland means having first supply passage means for supplying a heating medium, junction chamber means defining an annular junction chamber, said first supply passage means communicating with the interior of said junction chamber, said junction chamber means having an outer wall which separates said junction chamber from the interior of aid product, nozzle means in said outer wall directing heating medium from said junction chamber into the interior of said product in a downward direction towards said lower portion of said product, enclosure means defining an enclosure overlying said junction chamber, said piston gland means having a second supply passage means for supplying a pressurizing medium, said second supply passage means having second nozzle means disposed to discharge said pressurizing medium radially outwardly and axially upwardly at an acute angle relative to said central axis such that said pressure medium passes into said enclosure means, said enclosure means having a top wall and a bottom wall, said enclosure means also having a weir wall extending upwardly from said bottom wall at an obtuse angle relative to said bottom wall, said weir wall having an upper end spaced from said top wall to thereby define a weir passage between said upper end of said weir wall and said top wall of said enclosure means such that pressurizing medium passes from said enclosure means to the upper portion of the interior of said product through said weir passage.

8. An apparatus according to claim 7 further comprising plate means extending radially from said piston gland means, said plate means defining a common wall between said junction chamber means and said enclosure means, said plate means thereby defining said bottom wall of said enclosure means and said top wall of said junction chamber means, said plate means having an outer peripheral end, said weir wall extending radially outwardly and axially upwardly from said peripheral end.

9. An apparatus for vulcanizing an elastomeric product comprising mold means in which said elastomeric product to be vulcanized is disposed, said product having a central axis which is vertically disposed such that upper and lower interior portions of said product overlie one another, a piston gland means having first supply passage means for supplying a heating medium, junction chamber means defining an annular junction chamber, said first supply passage means communicating with the interior of said junction chamber, said junction chamber means having and outer wall which separates said junction chamber from the interior of said product, nozzle means in said outer wall directing heating medium from said junction chamber into the interior of said product in a downward direction toward said lower portion of said product, enclosure means defining an enclosure overlying said junction chamber, said piston gland means having an upper end, casing means mounted on said upper end of said piston gland means to define a casing compartment, said casing means being disposed within said enclosure means, second supply passage means in said piston gland means communicating with said casing compartment to supply a pressurizing medium to said casing compartment, said casing means having casing nozzle means for directing pressurizing medium from said casing compartment into said enclosure means, said enclosure means having a top wall and a bottom wall, said bottom wall having an outer peripheral end spaced from said top wall to thereby define a passage between said outer peripheral end and said top wall of said enclosure means such that pressurizing medium passes from said enclosure to the interior of said product through said passage.

10. An apparatus for vulcanizing an elastomeric product comprising mold means in which said elastomeric product to be vulcanized is disposed, said product having a central axis which is vertically disposed such that upper and lower interior portions of said product overlie one another, a piston gland means having first supply passage means for supplying a heating medium, junction chamber means defining an annular junction chamber, said first supply passage means communicating with the interior of said junction chamber, said junction chamber means having an outer wall which separates said junction chamber from the interior of said product, nozzle means in said outer wall directing heating medium from said junction chamber into the interior of said product in a downward direction toward said lower portion of said product, enclosure means defining an enclosure overlying said junction chamber, casing means mounted on said upper end of said piston gland means to define a casing compartment, said casing means being disposed within said enclosure means, second supply passage means in said piston gland means communicating with said casing compartment to supply a pressurizing medium to said casing compartment, said casing means having casing nozzle means for directing pressurizing medium from said casing compartment into said enclosure means, said enclosure means having a top wall and a bottom wall, said bottom wall being disposed at an acute angle relative to said central axis so as to incline axially upwardly toward said top wall, said bottom wall having an outer peripheral end spaced from said top wall to thereby define a passage between said outer peripheral end of said bottom wall and said top wall of said enclosure means such that pressurizing medium passes from said enclosure to the upper portion of the interior of said product through said passage.

11. An apparatus for vulcanizing an elastomeric product comprising mold means in which said elastomeric product to be vulcanized is disposed, said product having a central axis which is vertically disposed such that upper and lower interior portions of said product overlie one another, a piston gland means having first supply passage means for supplying a heating medium, junction chamber means defining an annular junction chamber, said first supply passage means communicating with the interior of said junction chamber, said junction chamber means having an outer wall which separates said junction chamber from the interior of said product, nozzle means in said outer wall directing heating medium from said junction chamber into the interior of said product in a downward direction toward said lower portion of said product, enclosure means defining an enclosure overlying said junction chamber, said piston gland means having an upper end, casing means mounted on said upper end of said piston gland means to define a casing compartment, said casing means being disposed within said enclosure means, second supply passage means in said piston gland means communicating with said casing compartment to supply a pressurizing medium to said casing compartment, said casing means having casing nozzle means for directing pressurizing medium from said casing compartment into said enclosure means, said enclosure means having a top wall and a bottom wall, said enclosure means also having a weir wall extending upwardly from said bottom wall at an obtuse angle relative to said bottom wall, said weir wall having an upper end spaced from said top wall to thereby define a weir passage between said upper end of said weir wall and said top wall of said enclosure means such that pressurizing medium passes from said enclosure means to the upper portion of the interior of said product through said weir passage.

12. An apparatus according to claim 11 further comprising plate means extending radially from said piston gland means, said plate means defining a common wall between said junction chamber means and said enclosure means, said plate means thereby defining said bottom wall of said enclosure means and said top wall of said junction chamber means, said plate means having an outer peripheral end, said weir wall extending radially outwardly and axially upwardly from said peripheral end.

* * * * *